3,347,903
DIFLUOROAMINO ALKYL NITRATE PREPARATION
Robert A. Smiley, Woodbury, N.J., assignor to E. I. du Pont de Nemours and Company, Wilmington, Del., a corporation of Delaware
No Drawing. Filed June 8, 1961, Ser. No. 115,822
4 Claims. (Cl. 260—467)

This invention relates to a process for preparing alkyl nitrates containing difluoroamino (—NF$_2$) groups in the molecule.

Compounds which contain —NF$_2$ and —ONO$_2$ groups are sources of much energy and consequently find use as ingredients for rocket propellants and explosives. In the past, the preparation of compounds of this type has been complicated by the fact that conventional methods of preparing nitrate esters, i.e., by the esterification of an alcohol by nitric acid, often cannot be used. In some cases, the preparation of an alcohol containing —NF$_2$ groups is impractical if not impossible, or the alcohol is so unstable as to preclude its use as a starting material for the preparation of the nitrate. For example, the preparation of 2,3-bis(difluoroamino)propanol, the precursor of 2,3-bis(difluoroamino)propyl nitrate, is impractical from the standpoint of yield as well as safety, and the alcohol is unstable on storage.

I have now found that an alkyl nitrate containing —NF$_2$ groups in the molecule can be prepared by a transesterification reaction between a difluoroamino-substituted alkyl formate and nitric acid. This procedure obviates the need for the difluoroamino-substituted alcohol, which may be unstable and/or difficult to prepare. The formate used as the starting material is convenient to prepare and is stable on storage. It can be prepared, for example, by the reaction of tetrafluorohydrazine with a formic acid ester containing olefinic unsaturation, e.g., allyl formate and the butenyl formates.

In the process of the present invention the difluoroamino-substituted alkyl formate is reacted with a nitrating mixed acid, i.e., nitric acid admixed with an agent which assists in the formation of the nitronium ion, NO$_2^+$, at a temperature in the range of about 0° C. to about 100° C. and preferably in the presence of a diluent. The mixed acid can be nitric acid admixed with sulfuric acid, acetic acid, acetic anhydride, trifluoroacetic anhydride, etc. For economic reasons, however, the use of a nitric acid-sulfuric acid mixture is preferred. Mixtures having percent compositions corresponding to those ordinarily used in nitration reactions can be used, e.g., mixtures ranging from 20% HNO$_3$/60% H$_2$SO$_4$/20% H$_2$O to 55% HNO$_3$/48% H$_2$SO$_4$ (said to have a negative percentage of water, —3%).

The amount of nitric acid used in the present process is at least one mole per mole of formate, i.e., the stoichiometric amount required to transesterify the formate. However, an excess of nitric acid generally will be used in order to assure complete reaction. The mole ratio of nitric acid to formate can range from 1/1 to about 50/1 or more.

While it is not necessary that the transesterification be carried out in the presence of a diluent, if desired an inert liquid diluent can be used in order to assist in dissipating the heat of reaction and in decreasing the oxidizing action of the nitric acid. Preferably, the inert diluent is a low-boiling compound, such as one of the chlorinated hydrocarbons, e.g., chloroform or methylene chloride.

The process of the present invention preferably is carried out at a temperature within the range of about 0° C. to about 100° C. While lower temperatures can be used, they generally are not practical because of the low reaction rate and the cooling required. Temperatures above 100° C. can be used, but operation at such temperatures generally is undesirable inasmuch as the nitrates often are not stable at these temperatures. The process can be effected at atmospheric as well as superatmospheric pressure. Generally, however, there is no advantage in operating at superatmospheric pressure with the possible exception that such pressure may be desirable when a low-boiling diluent is used.

The starting material used in the present process is an alkyl formate containing difluoroamino groups in the molecule. By "alkyl formate" I mean to include esters of formic acid,

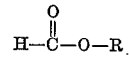

wherein R is a straight-chain or branched-chain aliphatic hydrocarbon radical containing at least two carbon atoms. Thus, the starting material can be a difluoroamino-substituted ethyl, propyl, isopropyl, butyl, sec-butyl, iso-butyl, amyl, tert-amyl, or iso-amyl, hexyl, octyl, or decyl formate, or a formate in which the aliphatic hydrocarbon radical contains any desired number of carbon atoms. For reasons of availability, I prefer to use an alkyl formate in which the alkyl group contains two to ten carbon atoms.

The number of difluoroamino substituents in the alkyl group of the formate can vary. However, because such compounds are readily prepared by the addition of —NF$_2$ groups across a double bond in olefinic formates, e.g., by reaction of such formates with tetrafluorohydrazine, the most readily available difluoroamino-substituted alkyl formates will be those contining at least two —NF$_2$ groups. More than two —NF$_2$ groups can be present, and indeed are desirable from the point of view of suitability of the nitrate product as a propellant ingredient. The position of the —NF$_2$ group(s) with respect to the formate function is not critical, the present process being applicable to alkyl formates having a —NF$_2$ group attached to the carbon adjacent to the carboxyl group as well as to those having a —NF$_2$ group attached to carbon atoms further removed from the carboxyl group. The alkyl formate used as the starting material in the present process can be a polyformate as well as a monoformate, and the process therefore can be used to prepare polynitrates as well as mononitrates.

The following example serves to illustrate specific embodiments of the process of the present invention. However, the example will be understood to be illustrative only and not to limit the invention in any manner. In the procedure described in the example, the 2,3-bis(difluoroamino)propyl formate was prepared by the reaction of allyl formate with tetrafluorohydrazine, specifically as follows:

Allyl formate (110 grams) and tetrafluorohydrazine (127 grams) were introduced continuously over a period of 303 minutes into a reactor consisting of 50 feet of copper tubing having an inside diameter of 0.5 inch and bent in the shape of a coil. The reactor temperature was 190° C. The product gases were cooled to about 25° C., and the condensed portion was collected and distilled under vacuum to give 148 grams of a colorless liquid which was shown to be 2,3-bis(difluoroamino)propyl formate by infrared and nuclear magnetic resonance spectra.

*Example*

Ten milliliters of a mixture of 50% nitric acid and 50% sulfuric acid (by weight) was placed in a 50-milliliter three-necked flask fitted with a stirrer, thermometer, and drying tube. The mixed acid was cooled in an ice-bath and 5 grams of 2,3-bis(difluoroamino)propyl formate was added slowly. A homogeneous clear solution resulted. The temperature of the reaction mixture was permitted to rise to room temperature. A two-phase system slowly formed as slow gas evolution took place. After two hours, the top product layer was taken up in methylene chloride. The methylene chloride solution was separated from the spent acid and then washed with water until the water was neutral. The methylene chloride layer was dried over magnesium sulfate, and the methylene chloride distilled off. The product was distilled through a straight take-off condenser, a water bath being used to heat the still pot. The product boiled sharply at 44° C. at 3 mm. and amounted to 3.4 grams of a colorless liquid, the infrared and nuclear magnetic resonance spectra of which were identical to the spectra of 2,3-bis(difluoroamino)propyl nitrate made by the nitration of 2,3-bis(difluoroamino)propanol.

The invention has been described in detail in the foregoing. It will be apparent to those skilled in the art that many variations are possible without departure from the scope of the invention. Therefore, I intend to be limited only by the following claims.

I claim:
1. A process for the preparation of difluoroamino-substituted alkyl nitrates which comprises reacting a difluoroamino-substituted alkyl formate with a nitrating acid at a temperature within the range of about 0° C. to about 100° C.

2. A process according to claim 1, wherein the nitrating acid is a mixture of nitric acid and sulfuric acid.

3. A process for the preparation of 2,3-bis(difluoroamino)propyl nitrate which comprises reacting 2,3-bis(difluoroamino)propyl formate with a nitrating acid at a temperature within the range of about 0° C. to about 100° C.

4. A process according to claim 3, wherein the nitrating acid is a mixture of nitric acid and sulfuric acid.

References Cited

Hoffman et al., Chem. Reviews, vol. 62, pp. 1 to 18 (1962).

CARL D. QUARFORTH, *Primary Examiner.*

LEON D. ROSDOL, ROGER L. CAMPBELL,
*Examiners.*

J. W. WHISLER, L. A. SEBASTIAN,
*Assistant Examiners.*